(12) United States Patent
Johnson et al.

(10) Patent No.: US 6,926,761 B2
(45) Date of Patent: Aug. 9, 2005

(54) ELECTRONIC BREATHER BAG FILTER

(75) Inventors: Christopher M. Johnson, Golden Valley, MN (US); Patrick L. McPhail, Minneapolis, MN (US); Vijay K. Garikipati, Eagan, MN (US); Andre D. Leier, Shakopee, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/442,399

(22) Filed: May 21, 2003

(65) Prior Publication Data

US 2004/0231518 A1 Nov. 25, 2004

(51) Int. Cl.[7] .................... B01D 46/10; B01D 53/04
(52) U.S. Cl. ........................ 96/135; 96/139; 96/147; 96/153; 55/385.6; 360/97.02
(58) Field of Search ................ 96/117.5, 134, 96/135, 139, 147, 152–154; 55/385.1, 385.6, 385.4, 385.7, 356; 360/97.02, 97.03, 97.04

(56) References Cited

U.S. PATENT DOCUMENTS

| | | | | | |
|---|---|---|---|---|---|
| 3,952,727 | A | * | 4/1976 | Nolan ........................ 604/333 |
| 4,614,528 | A | | 9/1986 | Lennen |
| 4,764,346 | A | * | 8/1988 | Lewis et al. ................ 422/120 |
| 4,802,900 | A | * | 2/1989 | Ball et al. ...................... 55/381 |
| 4,857,087 | A | * | 8/1989 | Bolton et al. ............... 55/385.6 |
| 4,875,899 | A | * | 10/1989 | Holtermann ................ 604/333 |
| 5,030,260 | A | * | 7/1991 | Beck et al. .................... 96/139 |
| 5,307,222 | A | | 4/1994 | Dion |
| 5,417,743 | A | * | 5/1995 | Dauber ........................... 96/13 |
| 5,447,695 | A | * | 9/1995 | Brown et al. ................ 422/171 |
| 5,538,545 | A | * | 7/1996 | Dauber et al. ................ 96/153 |
| 6,077,335 | A | * | 6/2000 | Schneider et al. ............ 96/135 |
| 6,146,446 | A | * | 11/2000 | Tuma et al. .................... 95/90 |
| 6,296,691 | B1 | * | 10/2001 | Gidumal ........................ 96/17 |
| 6,395,073 | B1 | * | 5/2002 | Dauber ......................... 96/134 |
| 6,398,830 | B1 | * | 6/2002 | Rhodes et al. ............. 55/385.1 |
| 6,475,269 | B1 | * | 11/2002 | Turner .......................... 96/134 |
| 6,475,270 | B1 | * | 11/2002 | Graeve ......................... 96/135 |
| 2002/0066372 | A1 | * | 6/2002 | White .......................... 96/424 |
| 2003/0047078 | A1 | * | 3/2003 | Ueki et al. .................... 96/135 |
| 2004/0006954 | A1 | * | 1/2004 | Yoo .......................... 55/385.6 |

FOREIGN PATENT DOCUMENTS

| | | |
|---|---|---|
| EP | 0358316 A2 * | 3/1990 |
| EP | 1 115 116 A1 | 7/2001 |
| JP | 60079580 | 7/1985 |
| JP | 05074129 | 3/1993 |

* cited by examiner

Primary Examiner—Robert H. Spitzer
(74) Attorney, Agent, or Firm—Merchant & Gould P.C.

(57) ABSTRACT

A breather bag filter assembly for use with an electronic enclosure, such as a hard disk drive enclosure containing a rotating disk, is disclosed. The filter assembly provides filtration of air entering and exiting an electronic enclosure through a breather hole. The filter assembly is a deformable sealed cavity that exchanges air with the drive enclosure as the air pressure inside the drive enclosure fluctuates. In one implementation of the invention the filter assembly contains three layers of material. Two layers of material form the exterior of the filter assembly surrounding a third layer that is composed of an adsorbent material.

31 Claims, 4 Drawing Sheets

ELECTRONIC BREATHER BAG FILTER

FIELD OF THE INVENTION

The present invention relates to filters and to methods for making and using filters. More particularly, the invention is directed to filters for use in preventing contamination from entering electronic enclosures as a result of air exchange into and out of electronic enclosures.

BACKGROUND OF THE INVENTION

Hard disk drives and other electronic equipment are often placed within enclosures to provide a clean environment that is necessary for optimal operation of the equipment. For example, hard disk drives normally contain at least one inflexible platter or disk coated with magnetic material that is positioned within an enclosure. The disk is rapidly spun and a magnetic read/write head "flies" a few microns above it in order to access or store data. The magnetic head rides on an air cushion, and it is desirable to position the head as close as possible to the disk without touching it in order to provide a high capacity drive.

Contaminants, including particles, gases, and liquids within the hard disk drive enclosure can act to reduce the efficiency and longevity of the hard drive. These contaminants can gradually damage the drive, cause deterioration in performance, and in certain situations can even cause sudden and complete drive failure. Contaminants can either enter the electronic enclosure from an external source or be generated from within the enclosure during use. Common sources of contaminants in disk drives include leaks, which may or may not be intentional, the manufacturing environment, which can contain certain contaminants, and materials incorporated into the disk drive which give off particulates and gases.

One particular concern regarding electronic enclosures is that contaminants from outside of the electronic enclosure should be prevented from entering the enclosure. When a disk drive is in operation, the air in the drive enclosure heats up which creates an increase in air pressure in the enclosure. As a result of this increase in pressure, air escapes from the drive if it is not sealed airtight or if it has a breather hole. When a disk drive ceases to be in operation, the air in the enclosure cools down and creates a decrease in air pressure in the enclosure. As a result of this decrease in pressure, air moves into the drive. If particulate or chemical contaminants are present in this exchanged air, the interior of the enclosure will become contaminated.

Therefore, a need exists for a filter for use in an electronic enclosure, in particular a filter that prevents contaminants from entering the enclosure due to the exchange of air with the exterior environment.

SUMMARY OF THE INVENTION

The present invention is directed to a filter assembly for use with an electronic enclosure, such as a hard disk drive enclosure containing a rotating disk. In one implementation of the invention, the filter assembly includes a breather bag attached to the outside of the drive enclosure such that there is an air exchange between the filter assembly and the drive enclosure. The filter assembly also typically contains an adsorbent to remove contaminants that move with air flowing into the filter assembly from the electronic enclosure. The filter and the drive enclosure are in fluid communication and create an airflow system that is closed to the exterior with expansion and contraction of air within the enclosure being accommodated by the breather bag. In this manner, the filter assembly also limits or prevents unfiltered air outside the drive enclosure from being exchanged with air inside the drive enclosure.

In one implementation of the invention the filter assembly contains three layers of material. Two layers of material form the exterior of the filter assembly surrounding a third layer that is composed of an adsorbent material. The edges of the two layers forming the exterior are sealed together to provide an airtight cavity or bag. A hole in one of the exterior layers is disposed to fit over a corresponding hole in the housing of an electronic component. Typically, the exterior layers are made of a deformable material. This configuration allows air to move into and out of the filter assembly when air pressure inside the housing increases or decreases.

In another implementation, the filter assembly contains only two layers of material. The two layers of material form a cavity that is substantially airtight except for an attachment hole defined by the bottom layer of material. In some embodiments the cavity or bag may further be configured to provide airflow channels through the cavity or bag. Such airflow channels may be formed by welding together the outer layers at places other than the edges of the layers. Such airflow channels may also be formed through other means.

The above summary of the present invention is not intended to describe each discussed embodiment of the present invention. This is the purpose of the figures and the detailed description that follows.

DRAWINGS

The invention may be more completely understood in connection with the following drawings, in which.

Figure 1:
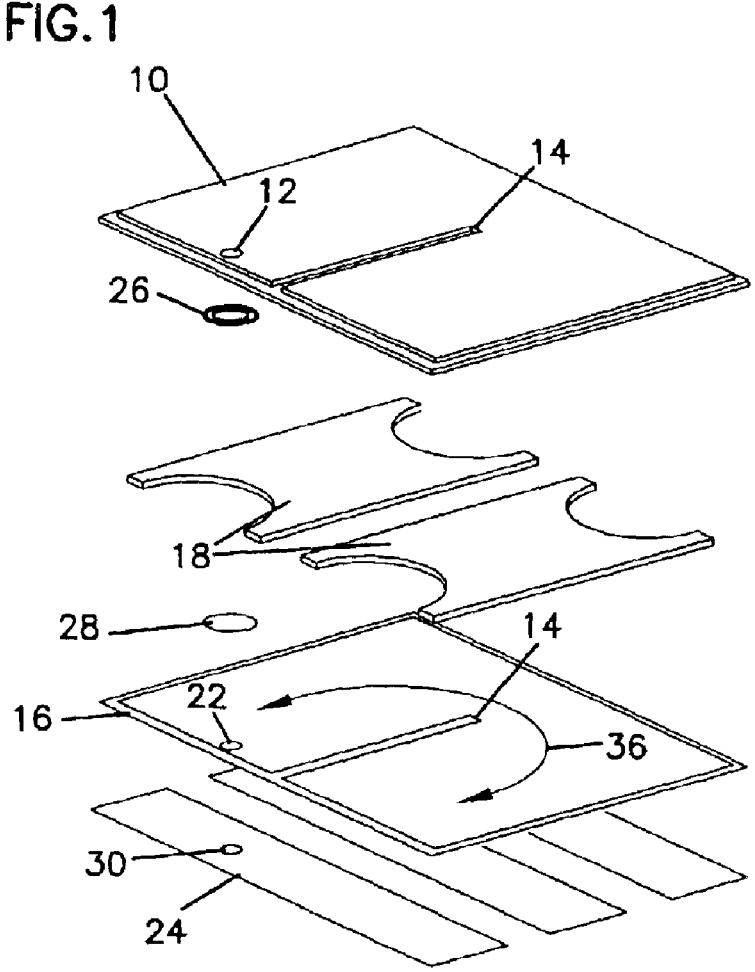
FIG. 1 is an exploded perspective view of a filter assembly constructed and arranged in accordance with the invention, showing the filter assembly before installation on an electronic enclosure.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The present invention is directed to a filter assembly for use on an electronic enclosure, such as a hard disk drive enclosure containing a rotating disk. The filter assembly provides filtration of air entering and exiting the enclosure through a breather hole. The filter includes a breather bag attached to the drive enclosure that is configured to exchange air with the drive enclosure. The filter assembly also typically contains an adsorbent to remove contaminants that move with air flowing into the filter assembly from the electronic enclosure. The filter and the drive enclosure are in fluid communication and prevent unfiltered air from outside the drive enclosure from being exchanged with air inside the drive enclosure. In this manner, attaching the breather filter to the electronic enclosure creates a substantially closed airflow system. This closed system prevents external air from entering the drive enclosure and the contaminants that such air may carry from entering the inside of the drive enclosure.

The filter of the present invention may also be used in combination with other filters. One example of this would be in a retrofit application. In a retrofit application an electronic enclosure may have been originally designed to function with a single specific filter. Later, however, a breather bag filter of the present invention may be added to the electronic enclosure to increase filtration performance. Alternatively, an electronic enclosure may be originally designed to function with a breather bag filter in combination with another type of filter. One skilled in the art will appreciate that there are many different possible filtration scenarios where a filter of the present invention may be used in combination with another filter.

The terms "adsorb", "adsorbing", "adsorbent", and the like are to be understood to encompass both adsorption and absorption phenomena and materials as used in the context of electronic enclosures. Although the filter assembly of the present invention may filter other fluids, the filtration of contaminants from air will be used as an illustration.

Typically, the filter assembly contains three layers of material: a top layer, a bottom layer, and an adsorbent layer. This configuration can be better understood with reference to FIG. 1, which shows an exploded perspective view of a filter assembly constructed and arranged in accordance with the invention. Top layer 10 is a deformable member, typically a film, sheet, or web. The top layer 10 may be made of many different materials. Typically the top layer is a deformable material that is not readily gas permeable. A deformable material allows air to move into and out of the filter assembly when air pressure inside the enclosure increases or decreases. An aluminum vapor barrier bag is one example of a suitable material. Top layer 10 defines a viewing hole 12 under which a sealing member 26 is affixed to make viewing hole 12 airtight yet suitable for viewing through the filter assembly to attachment hole 22.

The viewing hole 12 is used to help in positioning the attachment hole 22 of the filter properly over the breather hole on the drive enclosure. Weld line 14 is in both the top layer 10 and the bottom layer 16, of the depicted embodiment, and serves to connect them both in the interior of the filter assembly. In this manner, weld line 14 further serves to define an airflow path that generally follows line 36. Weld line 14 also serves to limit bag expansion. An adsorbent layer 18 may be in one or more pieces and is surrounded by top layer 10 and a bottom layer 16.

In practice, the top layer 10 and the bottom layer 16 may be two separate pieces sealed together to provide an airtight cavity or may simply be one continuous piece similar to a bag. In some embodiments, a particulate filter 28 fits over attachment hole 22. Such a particulate filter 28 is described in greater detail below. An adhesive layer 24 is disposed on the bottom side of the bottom layer 16. The adhesive layer 24 is used to mount the filter assembly to the drive enclosure (not pictured). An adhesive hole 30 is disposed in the adhesive layer 24.

In some embodiments, the filter assembly does not contain an adsorbent layer. Rather it simply comprises the exterior layers, or bag, and an attachment hole in the bottom layer. Thus, the adsorbent material is not required in all embodiments. Or alternatively, the adsorbent material may be disposed on the inside of the electronic device enclosure and the bag structure then serves simply as an air exchange chamber. Such an assembly may include a viewing hole in the top layer so as to assist in aligning the attachment hole in the bottom layer with the breather hole on the electronic enclosure.

Figure 2:
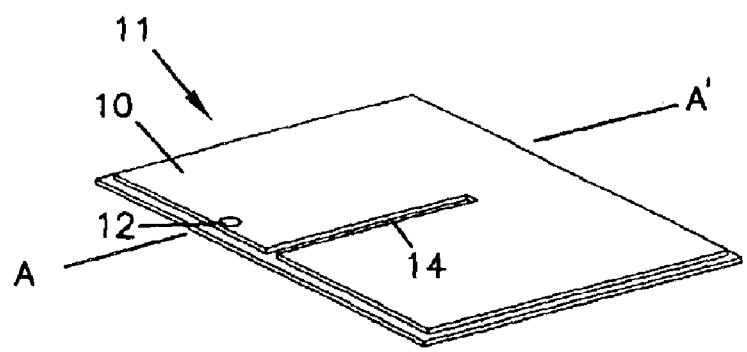
FIG. 2 is a front and top right perspective view of the filter assembly of FIG. 1.

Referring now to FIG. 2, a front and top right perspective view of a filter assembly 11 constructed and arranged in accordance with the present invention is shown. Filter assembly 11 shown from this view includes a top layer 10, a viewing hole 12, and an interior weld line 14. The top layer 10, is sealed to a bottom layer (not shown in FIG. 2) around its periphery. The two layers may be sealed thermally or ultrasonically, or using other sealing methods. The interior weld line 14 connects the top layer 10 and the bottom layer in the interior to define an airflow channel (not shown in FIG. 2). The viewing hole 12 is defined by the top layer 10 and allows one to view through the filter assembly 11.

Figure 3:
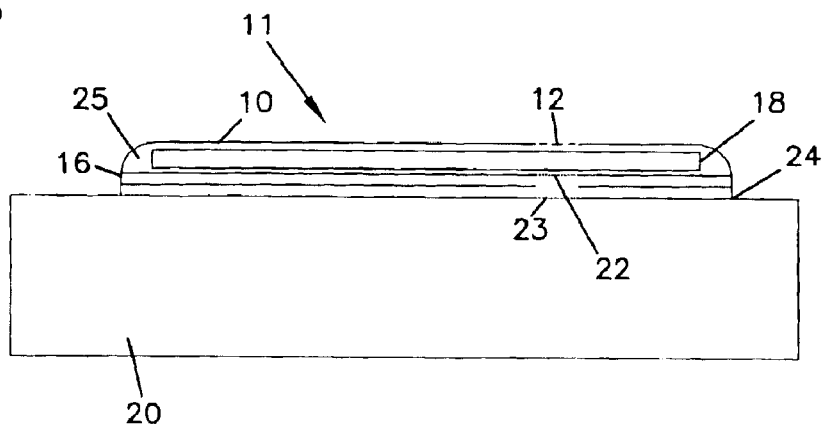
FIG. 3 is side cut-away view of the filter assembly of FIG. 1 taken along lines A–A' as shown in FIG. 2.

FIG. 3 is side cut-away view of the filter assembly of FIG. 1 taken along lines A-A' as shown in FIG. 2. In this view, the top layer 10 is shown sealed to the bottom layer 16 at the periphery. An adsorbent layer 18 resides in between and enclosed by the top layer 10 and the bottom layer 16. The viewing hole 12 is defined by the top layer 10. The attachment hole 22, is defined by the bottom layer 16 and is aligned with the breather hole 23 on the top of the electronic housing 20. The adhesive layer 24 is placed between the bottom layer 16 and the surface of the electronic housing 20. Generally, the adhesive layer 24 comprises a pressure sensitive adhesive and is covered by a release liner during shipping or storage. The adsorbent layer 18 is positioned within the enclosed cavity 25 so as to allow one to see through the viewing hole 12 and down to the attachment hole 22.

Figure 4:
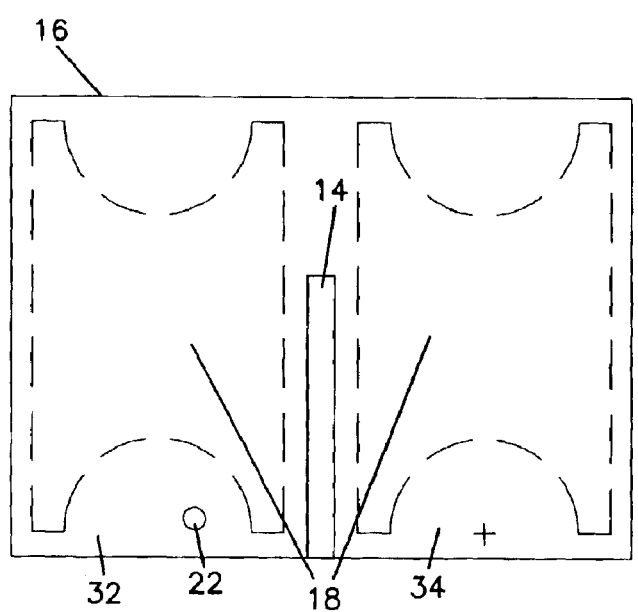
FIG. 4 is a top cut-away view of the filter assembly of FIG. 1, showing the filter assembly before installation in an electronic enclosure.

In FIG. 4, a top cut-away view of a filter assembly constructed and arranged in accordance with the invention is shown. The adsorbent layer 18 may comprise one or more pieces as shown. Further, the adsorbent layer 18 may be a variety of shapes. In the embodiment shown in FIG. 4, the pieces of the adsorbent layer are generally rectangular having a half-circle cut out of both ends. One skilled in the art will appreciate that the adsorbent layer can take on many different shapes in keeping with the spirit of the invention as described. The weld line 14 between the top layer 10 (not shown) and the bottom layer 16 does not completely cross the length of the filter defining a first area 32 and a second area 34 within the enclosed cavity. The bottom layer 16 defines an attachment hole 22. The attachment hole 22 can be located anywhere on the bottom layer 16, but is generally located off-center and proximal to one corner. When the filter assembly is attached to an electronic housing, attachment hole 22 is aligned with a breather hole 23 as shown in FIG. 3.

Figure 5:
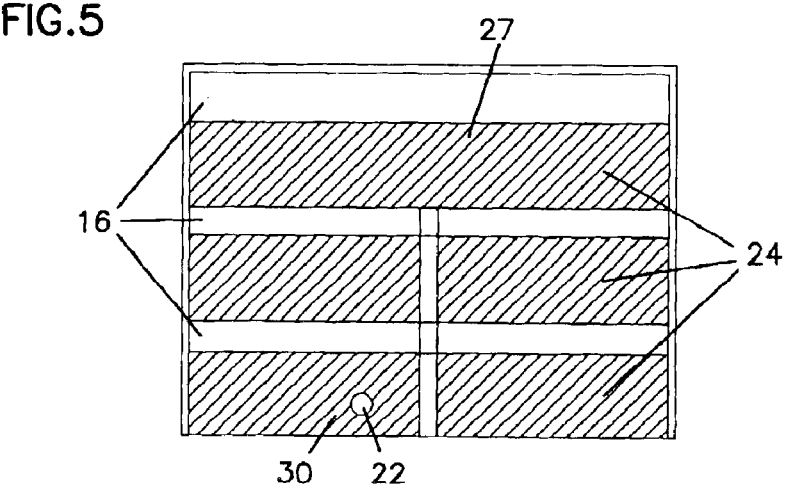
FIG. 5 is a bottom view of the filter assembly of FIG. 1.

Referring now to FIG. 5, a bottom view of a filter assembly constructed and arranged in accordance with the invention is shown. One or more adhesive strips 27 comprise the adhesive layer 24 and are disposed on the bottom layer 16 of the filter assembly. The attachment hole 22 is disposed on the bottom layer 16 and is aligned with an adhesive hole 30 defined by the adhesive layer 24. The adhesive layer 24 may take on many different shapes and may be in one or more segments or pieces. As before, the weld line 14 connects the bottom layer 16 with the top layer (10 not shown in FIG. 5).

The filter assembly may take on many different configurations without deviating from the spirit of the invention.

Figure 6:
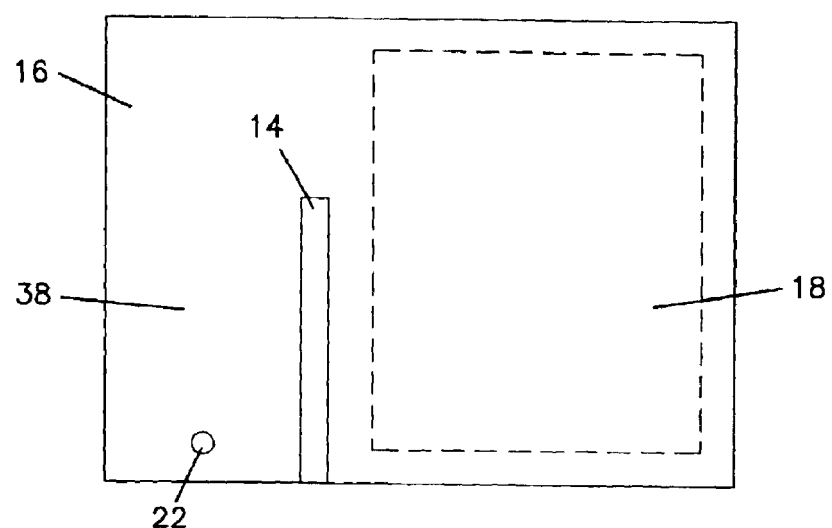
FIG. 6 is a top cut-away view of a filter assembly constructed and arranged in accordance with a second embodiment of the invention.

Some examples of different configurations are illustrated in FIGS. 6–9, although the invention is not limited to these only. In FIG. 6, a top cut-away view of a second embodiment of a filter constructed in accordance with the present invention is shown. Bottom layer 16 is divided by a weld line 14 that connects bottom layer 16 to top layer 10 (not shown). The adsorbent layer 18 resides in the deformable cavity created by bottom layer 16 connected to top layer 10 at the periphery. Attachment hole 22 is disposed near a corner of bottom layer 16. The positioning of weld line 14 close to one side of bottom layer 16 results in a narrow strip of cavity 38 which may function as a diffusion channel depending on its width.

Figure 7:
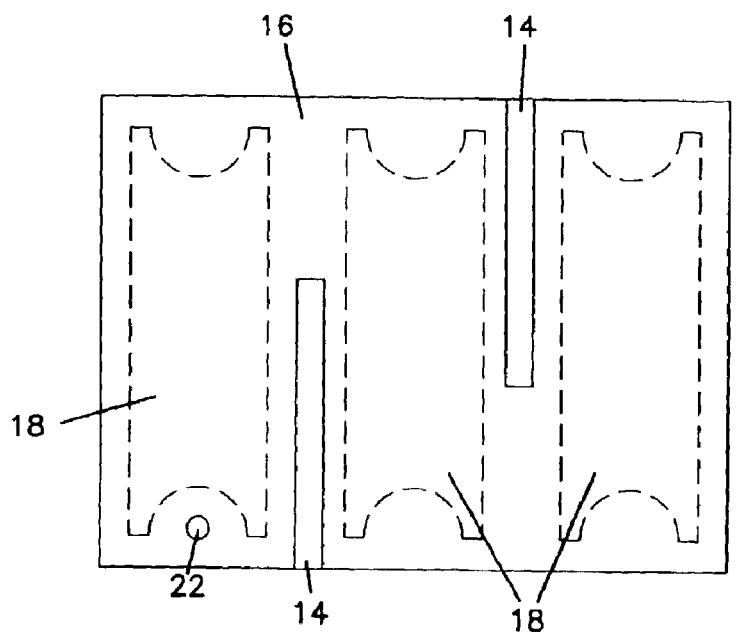
FIG. 7 is a top cut-away view of a filter assembly constructed and arranged in accordance with a third embodiment of the invention.

FIG. 7 shows a top cut-away view of a third embodiment of a filter constructed in accordance with the present invention. This embodiment shows one example of a "Z" shaped airflow channel. Bottom layer 16 is connected to top layer 10 (not shown) at the periphery and at two separate weld lines 14. Inside the deformable cavity formed between the top layer and the bottom layer are three adsorbent layer segments 18. Attachment hole 22 is defined by bottom layer 16.

Figure 8:
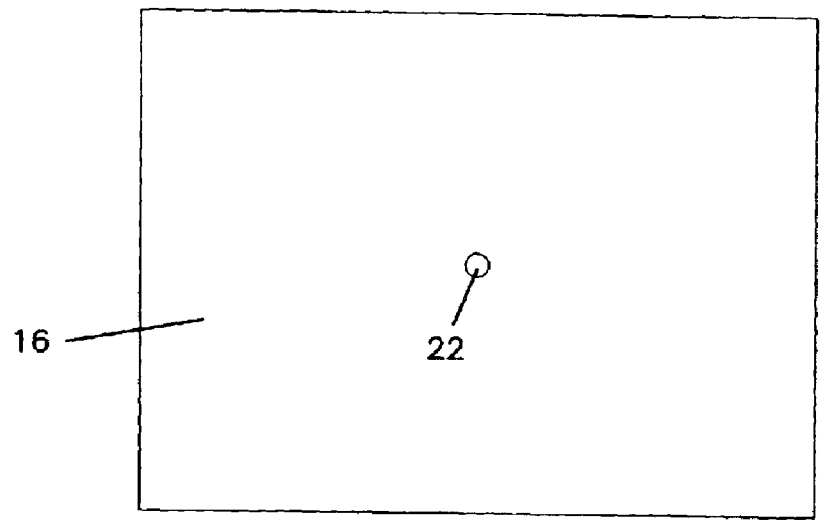
FIG. 8 is a top cut-away view of a filter assembly constructed and arranged in accordance with a fourth embodiment of the invention.

In FIG. 8, a top cut-away view of a fourth embodiment of a filter constructed in accordance with the present invention is shown. This embodiment shows an embodiment where there is no adsorbent layer or airflow channel. Attachment hole 22 is defined by bottom layer 16. The deformable cavity formed by the attachment of bottom layer 16 to top layer 10 (not shown) serves as an air exchange chamber for when air pressure builds up inside the electronic device housing.

Figure 9:
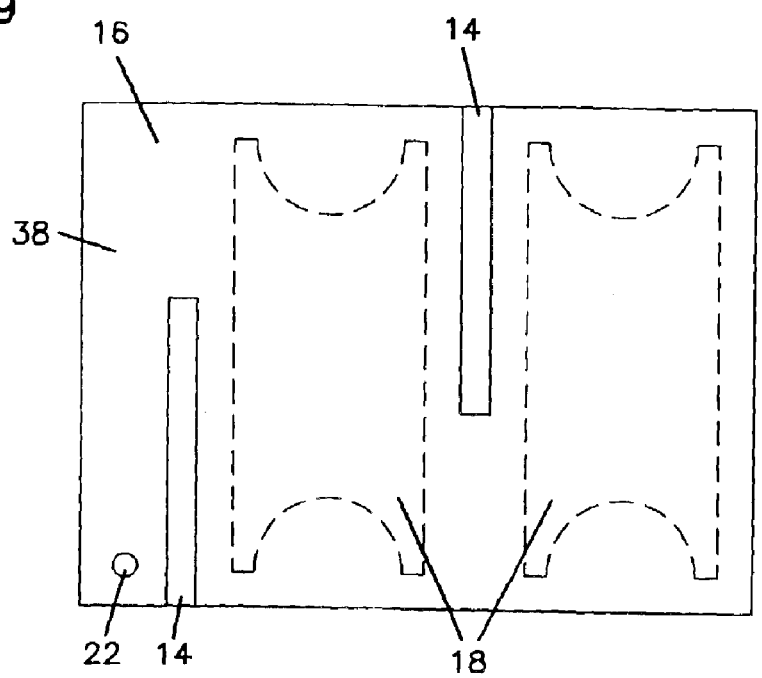
FIG. 9 is a top cut-away view of a filter assembly constructed and arranged in accordance with a fifth embodiment of the invention.

In FIG. 9, a top cut-away view of an additional alternative embodiment of a filter constructed in accordance with the present invention is shown. This embodiment shows a diffusion channel 38 being formed by one of the weld lines 14 being positioned close to the edge of bottom layer 16. The other weld line 14 divides the remaining open portion of the cavity formed between bottom layer 16 and top layer 10 into two larger portions. An adsorbent layer 18 is in each of these two portions.

Particular elements of the present invention will now be more fully described.

Airflow Channels

In some embodiments the cavity or bag may be further configured to provide air flow channels through the cavity or bag. While not intending to be bound by theory, the presence of such air flow channels in conjunction with air entering and exiting the filter in response to pressure changes allows for greater interaction between the air to be filtered and the adsorbent layer. Such airflow channels can be formed in a variety of ways. For example, airflow channels may be formed by welding the outer layers at places other than the edges. Alternatively, such airflow channels may be formed by inserting additional pieces of material into the filter cavity. Further still, the airflow channels may be formed simply by making depressions in the outer layers of material. One of skill in the art will appreciate that there are many different ways of forming airflow channels.

The airflow channels can take on many different precise shapes depending on various factors such as cost, shape of the adsorbent layer, length of airflow channel desired, etc. Typically, the shape of the airflow channel is circuitous. A circuitous airflow channel may be longer than the exterior dimensions of the filter assembly itself. One example of this is to create a "U" shaped airflow channel by creating a weld line between the two exterior pieces that does not completely cross the length of the filter assembly. When the attachment hole 22 is located near the end of the "U" shape, the air must travel the full length of the "U" shape to reach the other end of the filter assembly. Thus, in this example the airflow channel is longer than the exterior dimensions of the filter assembly. However, the airflow channel may also take on circuitous configurations where the airflow channel is not longer than the exterior dimensions of the filter assembly.

The weld line, or separation line, may be of many different lengths. For example, in some embodiments the weld line may extend across 80% or more of the length of the exterior pieces; in other embodiments the weld line may extend only 30% or less of the length of the exterior pieces. In specific embodiments, the weld line may be 65%, 75% or 85% of the length of the exterior pieces. One of skill in the art will appreciate that the length of the weld line may vary substantially depending on the embodiment.

The weld line, or separation line, may also be positioned in many different places along the width of the exterior pieces. In this manner, the weld line may create compartments that have different sizes. For example, in some embodiments, the weld line may be very close to one edge of the cavity or bag. In such an embodiment, the airflow channel created may act as a diffusion channel. In some embodiments, the distance between one edge of the exterior pieces or the bag and the weld line may be less than half of the total width of the exterior pieces or bag such as between 10% and 30%. In other embodiments this distance may be approximately half of the total width of the exterior pieces such as 40% to 60%. In still other embodiments this distance may be greater than half such as between 70% and 90%.

An even more circuitous airflow channel can be created by using two or more weld lines between the two exterior pieces. In an embodiment with two weld lines wherein the lines start on opposite sides the result is a "Z" shaped airflow channel. One of skill in the art will appreciate that many different airflow shapes are possible.

Adsorbent Regions

The adsorbent material comprising the adsorbent layer or region can include physisorbents and/or chemisorbents, such as desiccants (i.e., materials that adsorb or absorb water or water vapor) and/or materials that adsorb volatile organic compounds and/or acid gas. Acid gases can be generated inside an electronic enclosure, thus it is desirable to include an organic vapor adsorbent material impregnated with a chemical which provides enhanced acid gas removal. Exemplary chemicals which can be used to evaluate an impregnants ability to remove acid gas include hydrogen sulfide ($H_2S$), hydrochloric acid (HCl), chlorine gas ($Cl_2$), and the like.

Suitable adsorptive materials include, for example, activated carbon, activated alumina, molecular sieves, silica gels, potassium permanganate, calcium carbonate, potassium carbonate, sodium carbonate, calcium sulfate, or mixtures thereof. The adsorbent material may adsorb one or more types of contaminants, including, for example, water, water vapor, acid gas, and volatile organic compounds. Although the adsorbent material may be a single material, mixtures of materials are also useful. For typical operation, an adsorbent material that is stable and adsorbs within a temperature range of $-40°$ C. to $100°$ C. is preferred. Carbon is suitable for most implementations, and carbon suitable for use with the present invention is disclosed in U.S. Pat. No. 6,077,335, incorporated herein by reference in its entirety.

The adsorbent material can be provided in the form of a granular material, a tablet, a sheet, or other suitable form. In certain embodiments the adsorbent material is a powder that is bound together. In such implementations the adsorbent material can be a powder (passes through 100 mesh) or granular material (28 to 200 mesh) prior to forming into a shaped adsorbent article. The binder is typically dry, powdered, and/or granular and can be mixed with the adsorbent. In some embodiments, the binder and adsorbent material are mixed using a temporary liquid binder and then dried. Suitable binders include, for example, microcrystalline cellulose, polyvinyl alcohol, starch, carboxyl methyl cellulose, polyvinylpyrrolidone, dicalcium phosphate dihydrate, sodium silicate, and polytetrafluoroethylene.

Particulate Filter

When the adsorbent region is constructed from certain materials, for example carbon, it may itself be a source of particulate contaminants. As such, in many embodiments there must be a particulate filter that prevents particulate contaminants of the adsorbent region from entering and affecting the performance of the electronic device. In many embodiments, this particulate filter is connected on top of the attachment hole in the bottom layer of the filter. However, in other embodiments, the particulate filter may actually be contained within the housing of the electronic device to which the bag filter assembly is attached.

The particulate filter removes and retains particulate contaminants. The particulate filter can be, for example, a polymeric material containing an electrostatic composition. The particulate filter may include a porous polymer film made from, for example, polyethylene, polypropylene, polytetrafluoroethylene, or expanded polytetrafluoroethylene. The particulate filter may optionally include a woven or nonwoven scrim or support layer to support the porous polymer film.

Viewing Hole

Many embodiments of the invention will also contain a viewing hole in the upper exterior layer. The viewing hole is simply an aperture through which one can see to ensure that the attachment hole in the bottom layer of the filter is aligned with the breather hole on the electronic enclosure. The viewing hole is sealed by a sealing member in a manner that allows light to pass through but prevents air from passing through. Typically the viewing hole will be aligned with the hole in the bottom layer of the filter. However, the viewing hole may also be offset while still performing the function of allowing one to see that the filter is lined up properly with the breather hole on the electronic enclosure.

Many different materials may be used to provide a sealing member. One example of such a material is polyester (e.g., Mylar®). Other examples of suitable materials include polyethylene, polypropylene, nylon, polycarbonate, polyvinyl chloride, and polyvinyl acetate films.

Attachment Hole

The hole in the bottom layer of the two exterior layers may also be referred to as an attachment hole to the extent it is configured to be attached and in fluid communication with the breather hole on the electronic enclosure. The attachment hole can be in any position on the bottom layer. However, it is typically located off center and proximal to a corner. The attachment hole can take on a variety of shapes constrained only by the requirement that it attaches to and forms a seal with the breather hole on the electronic enclosure.

It will be appreciated that, although the implementation of the invention described above is directed to a hard drive enclosure, the present device may be used with other electronic enclosures where a clean environment is desired, and is not limited to hard drive enclosures. In addition, while the present invention has been described with reference to several particular implementations, those skilled in the art will recognize that many changes may be made hereto without departing from the spirit and scope of the present invention.

We claim:

1. A filter assembly for use on an electronic enclosure, the filter assembly comprising:
    a first layer defining a first aperture;
    a second layer; and
    a third layer located between the first and second layers, the third layer comprising an adsorbent material;
    wherein the first and second layers surround the third layer and define an expandable cavity that is sealed to fluid flow except for the first aperture.

2. The filter assembly of claim 1, wherein the first and second layers comprise a water resistant, chemical resistant material.

3. The filter assembly of claim 2, wherein the water resistant, chemical resistant material comprises an aluminum vapor barrier bag.

4. The filter assembly of claim 1, further comprising a sealing member covering a second aperture defined by the second layer.

5. The filter assembly of claim 4, wherein the sealing member comprises a transparent material.

6. The filter assembly of claim 1, further comprising an adhesive layer; wherein the adhesive layer is attached to the first layer.

7. The filter assembly of claim 1, wherein expandable cavity comprises a first region and a second region that are in fluid communication with each other; wherein the first aperture is located in the first region.

8. The filter assembly of claim 7, wherein the first and second layers are welded together.

9. The filter assembly of claim 8, wherein the first region and the second region are divided by a line where the first layer and second layer are welded together; wherein the line does not extend the full length of the first layer and the second layer, defining a fluid passage area connecting the first region and the second region.

10. The filter assembly of claim 7, wherein the adsorbent material further comprises a first segment and a second segment; wherein the first segment is contained within the first region and the second segment is contained within the second region.

11. The filter assembly of claim 1, wherein the adsorbent material comprises carbon.

12. The filter assembly of claim 1, further comprising a particulate filter that is positioned to filter air entering and exiting through the first aperture.

13. An air-exchange filter assembly comprising:
    a deformable filter bag defining an attachment hole; and
    an adsorbent material disposed within the filter bag.

14. The air-exchange filter of claim 13, wherein the filter bag defines a fluid-flow path from the attachment hole through the interior of the filter bag.

15. The air exchange filter assembly of claim 14, wherein the fluid-flow path is longer than the external dimensions of the filter bag.

16. The air exchange filter assembly of claim 14, wherein the filter bag has a first side and a second side; wherein the fluid flow path is defined by a weld between the first side and the second side of the filter bag.

17. The air exchange filter assembly of claim 14, further comprising a particulate filter disposed in the fluid-flow path, such that fluid moving in and out of the filter bag must pass through the particulate filter.

18. The air exchange filter assembly of claim 13, wherein the adsorbent material comprises carbon.

19. The air exchange filter assembly of claim 13, wherein the filter bag comprises an aluminum vapor barrier bag.

20. The air exchange filter assembly of claim 13, further comprising a transparent sealing member covering an alignment hole defined by the filter bag.

21. The air exchange filter assembly of claim 13, wherein the filter bag is configured to expand as air enters the attachment hole and is configured to contract as air exits the attachment hole.

22. An air exchange assembly comprising:
    a deformable bag defining an attachment hole and an alignment hole;
    wherein the alignment hole is covered by a transparent sealing member.

23. The air exchange assembly of claim 22, further comprising a particulate filter disposed such that fluid moving in and out of the deformable bag must pass through the particulate filter.

24. The air exchange assembly of claim 23, further comprising an adsorbent material disposed within the deformable bag.

25. An air exchange filter assembly comprising:
a deformable bag defining an attachment hole;
an adsorbent material disposed within the deformable bag; and
a particulate filter.

26. The air exchange filter assembly of claim 25, wherein the particulate filter is positioned to prevent particulate contaminants from entering the interior of an electronic device housing.

27. An air exchange assembly comprising:
a deformable bag defining a attachment hole and a divider line;
wherein the divider line partially separates the interior of the deformable bag into two or more portions.

28. The air exchange assembly of claim 27, further comprising an alignment hole defined by the deformable bag.

29. The air exchange assembly of claim 28, further comprising a particulate filter positioned to prevent particulate contaminants from exiting the air exchange assembly.

30. An air exchange filter assembly comprising:
a deformable bag defining a attachment hole; and
a particulate filter positioned to prevent particulate contaminants from exiting the air exchange filter assembly.

31. The air exchange filter assembly of claim 30, wherein opposite sides of the deformable bag are connected defining an airflow path in the interior of the bag.

* * * * *